United States Patent
You et al.

(10) Patent No.: US 7,012,655 B2
(45) Date of Patent: Mar. 14, 2006

(54) LIQUID CRYSTAL DISPLAY DEVICE WITH DIGITIZER

(75) Inventors: Dong Jae You, Kumi-shi (KR); Nam Do Son, Kyongsangnam-do (KR); Sung Hoon Lee, Taegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 52 days.

(21) Appl. No.: 10/742,917

(22) Filed: Dec. 23, 2003

(65) Prior Publication Data

US 2004/0189887 A1      Sep. 30, 2004

(30) Foreign Application Priority Data

Mar. 28, 2003 (KR) .................. 10-2003-0019579
Mar. 28, 2003 (KR) .................. 10-2003-0019582

(51) Int. Cl.
*G02F 1/1335* (2006.01)
(52) U.S. Cl. .......................... 349/12; 349/58
(58) Field of Classification Search ............... 349/12, 349/58, 65
See application file for complete search history.

(56) References Cited

U.S. PATENT DOCUMENTS

2004/0130538 A1 *  7/2004   Lin ..................... 345/178

FOREIGN PATENT DOCUMENTS

JP   08-179289    12/1996
KR   U2000-0005334   3/2000

* cited by examiner

*Primary Examiner*—James A. Dudek
(74) *Attorney, Agent, or Firm*—McKenna Long & Aldridge LLP

(57) ABSTRACT

An LCD device with a digitizer and a method for manufacturing the same is disclosed, which has a stable insertion structure of a digitizer to an LCM, thereby obtaining thin profile and lightness of the LCD device, and improving yield. Also, in the LCD device with the digitizer according to the present invention, a reflecting means is formed for being integrated with the digitizer.

16 Claims, 4 Drawing Sheets

LIQUID CRYSTAL DISPLAY DEVICE WITH DIGITIZER

This application claims the benefit of the Korean Application Nos. P2003-19579 and P2003-19582 both filed on Mar. 28, 2003, which are hereby incorporated by reference for all purposes as if fully set forth herein.

BACKGROUND OF THE INVENTION

1. Field of the Invention

The present invention relates to a liquid crystal display (LCD) device, and more particularly, to an LCD device with a digitizer and a method for manufacturing the same.

2. Discussion of the Related Art

The resolution of a liquid crystal display (hereinafter, referred to as "LCDs") has been rapidly increased by the improvements in liquid crystal materials and micro fabrication technology with characteristics of lightweight, filed emission display and low power consumption. Also, the range of applications in which LCDs are used is becoming broader. As an example, the LCD is used as a display device of a notebook personal computer (hereinafter, referred to as "NTPC".) The NTPC is slim and lightweight. A liquid crystal module (hereinafter, referred to as "LCM") used in various video display devices including a backlight unit and a liquid display panel, will be explained.

FIG. 1 is an exploded view of a general liquid crystal display module LCM 10. As shown in FIG. 1, the LCM 10 includes a backlight 12 and an LCD panel 11. The backlight 12 and the LCD panel 11 are supported by a main support 13 and a top case 20. A reflecting plate 12a, a light-guiding plate 12b, a first diffusing or protecting sheet 12c, a first prism sheet 12d, a second prism sheet 12e and a second diffusing or protecting sheet 12f are stacked up in that order on top of the main support 13. Meanwhile, an upper side of the LCD panel 11 is connected to the top case 20 of the metal material, and a lower side of the LCD panel is supported by the main support 13. The backlight, including the reflecting plate 12a, the light-guiding plate 12b and the sheets, is a lower unit underneath the LCM 10 for uniformly irradiating light to the LCD panel.

Recently, high resolution of LCD devices has been realized as a result of great improvements in LCD technology, making LCDs useful in high resolution graphics work. In addition, a digitizer is used as an input device in a computer having the aforementioned LCD device as well. The digitizer of the LCD device is classified into a resistive type, electrostatic capacitance type and EM (electro-magnetic) type according to the method of determining a user-indicated location.

The resistive type senses a location being pressed by determining pressure through a change of an amount of an electric current in a the direct current voltage that is obtained. The electrostatic capacitance type senses the pressed location by using capacitance coupling in an alternating current voltage signal that is obtained. The electromagnetic type senses the pressed location by detecting a resonance frequency in a magnetic field that is obtained. Each type has different characteristics of signal amplification problems, different resolutions and a different degree of difficulty of design and technology. The type of digitizer used depends on the precision, based on optical, electrical, mechanical, size, and input characteristics as well as endurance and economical efficiency.

The design and structure of the EM type digitizer merits closer scrutiny for its ability to discriminate an exact location better than the other types of digitizers. The EM type digitizer includes a digitizer having two sets of array coils, one set of which is parallel to the other set, and an electronic (stylus). The EM type digitizer may be formed at the rear of the backlight of the aforementioned LCD device.

FIG. 2 is a block diagram illustrating a driving circuit and a driving method of an EM type digitizer according to the related art. Referring to FIG. 2, the digitizer includes a digitizer plate 40, a controller 15, and an electronic (stylus) pen 39. At this time, the digitizer plate 40 serves as a sensor detecting a touching point by transmitting and receiving an electromagnetic wave resonated in the touching point, and the controller 15 controls the digitizer plate. Also, the electronic pen 39 communicates with the digitizer plate 40 by transmitting and receiving electromagnetic waves.

Furthermore, the digitizer plate 40 (hereinafter, referred to as 'digitizer') includes a sensor PCB having a plurality of X-axis and Y-axis coils, a shield plate (not shown) blocking the electromagnetic wave at a bottom of the sensor PCB and a connector having a switching means for directing transmitting and receiving modes of the sensor PCB and selecting the X or Y axis coils. The controller 15 positioned at the bottom of the digitizer 40 includes a CPU (control processor unit) sending a signal to the digitizer and reading the input signal so as to detect the location of the electronic pen 39. The electronic pen 39 includes a resonance circuit having there in a coil and a condenser.

The structure of the digitizer 40 will be described as follows. The digitizer 40 includes X-axis and Y-axis coil arrays and X-MUX and Y-MUX coupled to the X-axis and Y-axis, respectively. A specified Y-axis coil is selected by a Y address signal (Y-ADDR), a specified X-axis coil is selected by an X address signal (X-ADDR) for reading. Both X and Y address signals are generated from the controller 15.

A sine wave and an electromagnetic wave are sent to X-axis and Y-axis by the controller 15 and the output signal from the X-axis and Y-axis coil is sent to the controller 15. The controller 15 includes a sine wave generator 31 generating the sine wave and sending it to the coils, an amplifier 32 amplifying the sine wave generated from the sine wave generator 31, a switch 30 sending the sine wave amplified from the amplifier 32 to the coil or sending a signal from the coil to the controller 15, an amplifier 34 grading and amplifying an output signal generated from the coil by the switch 30, a wave detector 35 detecting waves from output of the amplifier 34, a low pass filter 36 filtering the signal generated from the wave detector 35, a sample and hold unit 37 (S/H) sampling, holding and outputting a signal generated from the low pass filter 36, an analog-digital converter 38 converting the size and polarity of an analog signal outputted from the sample and hold unit 37 to a digital format and outputting the digital signal, and a processor 33 reading the output signals from the analog-digital converter 38 for finding the location of the electronic pen 39 and controlling all other units. While the analog-digital converter 38 is digitizing, the sample and hold unit 37 holds a measured value of a coil and a second following coil measurement is started at a front circuit.

The digitizer 40 includes a plurality of coils being piled up on a flexible surface of the PCB. Each coil is arrayed against X-axis and Y-axis, and has a first side being connected to a grounding voltage and a second side being connected to a mux unit in which one coil is chosen to be connected to an electric potential line of a fixed level.

The operation of the electromagnetic induction touch panel is as follows. The sine wave generated from the sine wave generator 31 by the processor 33 is transmitted to the sensor unit 29 through the amplifier 32 and the switch 30. The sensor unit 29 selects an X-axis coil and a Y-axis coil so as to generate electromagnetic waves by inducing an electromagnetism. The electronic pen 39 is resonated, the resonant frequency is held for a predetermined time and the sensor unit 29 receives the electromagnetic waves generated from the electronic pen 39.

The electric pen 39 includes the resonance circuit. The resonance circuit is an RLC complex circuit in which a maximum electric current flows at a specified frequency of an approved power. The resonant frequency can abstract output characteristics of a specified resonant frequency. The resonant frequency (f) is expressed as a mathematic formula as $$f = \frac{1}{2\pi\sqrt{LC}}$$

(here, L is an inductance of a coil and C is a capacity of the condenser.) According to the electronic pen 39, each sine wave voltage in different sizes is induced to each coil arrayed in the sensor unit 29 and inputted into the processor 33 through the wave detector and the analog-digital converter 38.

The processor 33 calculates the value of the position of the electronic pen 39 on the digitizer 40 from the value induced to a coil and outputs the angle value between 0° and 360°. The output data of the electronic pen 39 is induced to the liquid crystal display panel or stored in the processor 33.

It is more convenient for a user to draw a figure when an area of the electromagnetic digitizer is larger and it is more efficient when the resolution is higher. The resolution is inversely proportional to the space between coils in the digitizer 40. That is, when the spaces between the coils are narrower, the resolution becomes higher. The electromagnetic touch panel using a totally different method from the resistant film type detects an exact location of the electronic pen by using a characteristic of an electromagnetic field being induced and being resonated. The electromagnetic touch panel uses a stable way for not affecting image quality and includes the sensor unit and the controller at the rear of a display device so as to maintain the high transmittance of the display device. The electromagnetic touch panel is not affected by hand touch but only by the pen, and the writing is as natural as handwriting. Therefore, it can be used in graphic design, or in business.

In the EM type, a plurality of coils are provided inside the digitizer 40, so that it is possible to detect the touching point of the electron pen 39 by detecting electric field changes. Accordingly, unlike the resistive type, mounting the digitizer at the front of the LCD panel is not required as it is in the EL type. That is, the digitizer of the EM type may be mounted at the rear of the LCM 10. In case the LCM 10 having electromagnetic connection characteristics is formed, it is possible to detect the touching point of the electron pen even though the digitizer 40 is positioned below the LCM 10.

FIG. 3 schematically illustrates the digitizer mounted at the rear of the LCM. In general, a printed circuit board (hereinafter, referred to as PCB) is provided at the bottom of the main support at the rear of the LCD device. A drive integrated circuit (hereinafter, referred to as D-IC) for driving switching devices (TFT array) of the LCM 10 is provided on the PCB. And, the LCM 10 and the PCB 45 having the D-IC are electrically connected by a tape carrier package 14 (hereinafter, referred to as TCP) so as to send a control signal of the D-ICs (a gate line driving signal) and a video signal (a data line driving signal) to each gate and data line of the LCD panel. Although there is minor variation among products, a PCB 45a having a drive IC for driving the data line is connected to the TCP 14 at a corner in a long-axis direction of the LCD panel and the PCB 45b having the drive IC for driving the gate line at a corner in a short-axis direction of the LCD panel.

Accordingly, the LCM is driven by a control signal and a video signal of the D-IC provided at the PCB 45, and changes the structure of the arrangement of liquid crystals to display picture corresponding to the video signal by a light channel formed according to the arrangement of liquid crystals on the liquid crystal display device. Therefore, when the digitizer is provided at the rear of the LCM, it is desirable that the electro-magnetically uniform LCM is arrayed on a top surface of the digitizer and materials that are not electro-magnetically uniform such as the PCB are provided on a lower surface of the digitizer.

An assembling method for an LCD device having an EM type digitizer as described in FIG. 3 includes inserting the digitizer between the main support 13 and the PCB 45 after the LCM 10 is assembled. When inserting the digitizer, as shown in FIG. 3, the digitizer should be lifted upward and fixed into place to reduce a damage to the TCP 14 when electrically connecting the PCB 45 to the LCD panel 10.

However, there are a number of problems in lifting the PCB 45 and fixing the digitizer as follows. First, when the digitizer 40 is fixed, the inserted digitizer, the PCB 45 and the TCP 14 are contacted and damaged, reducing quality. Also, when the PCB 45 and the TCP 14 are lifted to insert the digitizer, the TCP 14 connected to the PCB 45 is contacted with the top case 20 and is easily cracked. Particularly, the quality and manufacturing yield are reduced when the PCB 45 are provided at both corners of the long and short axis direction of the liquid crystal display panel. Furthermore, in the case where an end of the top case 20 has a burr having a kinked end the damage of the TCP is accelerated.

Second, the PCB that is screwed into place left a predetermined space remaining between the main support and the PCB so as to allow insertion of the digitizer according to the related art devices art. But the size of the LCD had to be large to accommodate this extra space such that the digitizer was not provided in an LCD that was lightweight and slim.

Therefore, when the digitizer was inserted between the LCM and PCB, there was a problem that PCB had to be lifted and the PCB and the TCP were prone to easy damage. The quality of the devices and the manufacturing yield.

SUMMARY OF THE INVENTION

Accordingly, the present invention is directed to an LCD device with a digitizer that substantially obviates one or more problems due to limitations and disadvantages of the related art.

An advantage of the present invention is to provide an LCD device having a stable structure for insertion of into a digitizer an LCM, and which is suitable for obtaining thin profile and lightness of the LCD device, and improving manufacturing yield.

Additional advantages of the invention will be set forth in part in the description which follows and in part will become apparent to those having ordinary skill in the art upon examination of the following or may be learned from practice of the invention. Other advantages of the invention may be realized and attained by the structure particularly pointed out in the written description and claims hereof as well as the appended drawings.

To achieve these and other advantages and in accordance with the purpose of the invention, as embodied and broadly described herein, an LCD device with a digitizer includes a main support having therein an LCD panel, and a backlight for providing light to the LCD panel; a lamp provided at one side of the main support for emitting light; a lamp housing surrounding the lamp and having an opening; and a digitizer having one end thereof inserted to the opening of the lamp housing.

An upper surface of the digitizer is formed of a reflecting means.

In another aspect, a method for manufacturing an LCD device with a digitizer includes a first step of adhering a lamp housing surrounding a lamp to one side of a main support; a second step of inserting each end of a digitizer and a light-guiding plate into an opening of the lamp housing; and a third step of depositing a plurality of sheets and an LCD panel to form light-path by guiding light to an upper side of the lamp housing.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

An LCD device with a digitizer and a method for manufacturing the same according to the present invention will be described with reference to the accompanying drawings. The LCD device according to the present invention includes a main support, a lamp, a lamp housing, and a digitizer having one end inserted to an opening of the lamp housing to detect coordinates of a touching point.

Figure 4:
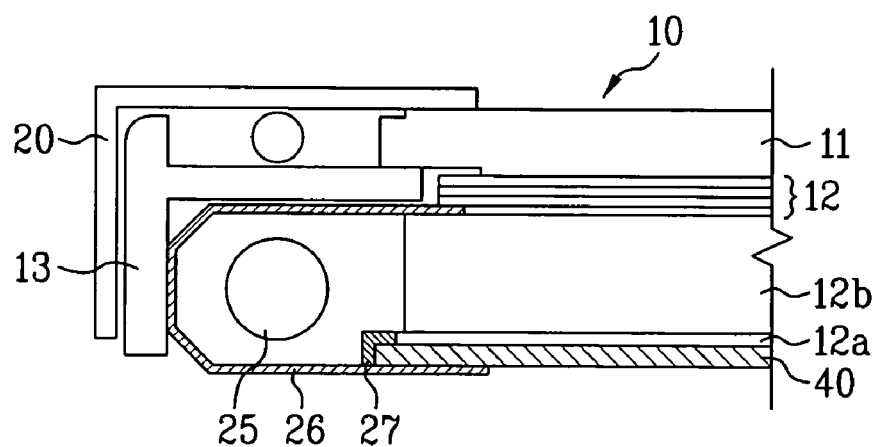
FIG. 4 is a cross-sectional view illustrating a digitizer mounted to an incident part of an LCD device according to the present invention.

FIG. 4 is a cross-sectional view illustrating a portion adjacent to a lamp housing 26 of an LCD device with a digitizer 40 according to the present invention, in which a portion of a main support 13, to which a lamp 25 is mounted, is referred to as an incident part, and an opposite side is referred to as an opposite-incident part.

As shown in FIG. 4, the lamp 25 is provided at one side of the main support 13 along a long-axis direction of an LCM 10. Generally, the lamp 25 is a cold cathode fluorescent lamp (CCFL). That is, the lamp 25 emits light, and then the light is reflected to an upper side by a reflecting plate 12a without light leaking outside the device. Also, a light is reflected on an inner surface of the lamp housing 26 surrounding the lamp 25. Then, a light-guiding plate 12b is provided on the reflecting plate 12a for uniformly emitting the incident light to the upper side. Subsequently, the light emitted from the light-guiding plate 12b passes through a plurality of sheets 12 such as a diffusion sheet, a protecting sheet, and a prism sheet, and then the light is incident on the LCD panel 11, thereby displaying a desired image.

The digitizer 40 according to the present invention is different from a digitizer according to the related art in that the digitizer 40 according to the present invention is not provided at the back of the LCM 10. That is, the digitizer 40 according to the present invention is assembled in a state of inserting one end thereof to an opening of the lamp housing 26 during assembly of the backlight of the LCM 10. In one embodiment, the digitizer 40 is a sensor detecting in an electromagnetic EM mode coordinates where an electron (stylus) pen touches.

Referring to FIG. 4, the lamp housing 26 has an opening at a portion adjacent to the light-guiding plate 12b, whereby the light is effectively incident on the light-guiding plate 12b. At this time, one end of the digitizer 40 is inserted into the opening of the lamp housing 26, and the reflecting plate 12b is provided on the digitizer 40. Also, the light-guiding plate 12b is provided on the reflecting plate 12a. Herein, each end of the light-guiding plate 12b, the reflecting plate 12a and the digitizer 40 are inserted to the opening of the lamp housing 26. Thus, it is necessary to maintain the digitizer that is inserted into the opening of the lamp housing 26 at a correct position so that it cannot be moved by an external force. That is, each one end of the light-guiding plate 12b, the reflecting plate 12a and the digitizer 40 is inserted to the opening of the lamp housing 26, whereby the digitizer 40 is clamped by the lamp housing 26. As a result, it is possible to fix the light-guiding plate 12b, the reflecting plate 12a and the digitizer 40. In order to clamp the light-guiding plate 12b, the reflecting plate 12a and the digitizer 40 with the lamp housing 26, the lamp housing 26 is formed of a metal material having stiffness and flexibility. For example, the lamp housing 26 is formed of stainless steel or aluminum. However, it is possible to form the lamp housing 26 with any other material having stiffness and the desired flexibility.

As shown in FIG. 4, the plurality of sheets 12 are deposited on the clamped light-guiding plate 12b for forming the proper light-path by concentrating the light emitted from the light-guiding plate 12b to the upper side. Then, the LCD panel 11 is provided on the plurality of sheets 12. At this time, polarizing plates are respectively provided on upper and lower surfaces of the LCD panel 11.

In the structure for mounting the digitizer 40 according to the present invention, one end of the digitizer 40 is inserted into the lamp housing 26. In this respect, it is necessary to prevent the light from leaking at a contact portion between the digitizer 40 and the lamp housing 26. Also, the light may leak at a contact portion between the digitizer 40 and the reflecting plate 12a. Accordingly, referring to FIG. 4, a supplementary reflecting plate 27 is provided in a portion, to which the light of the lamp 25 is directly irradiated, at one end of the digitizer 40 inserted to the lamp housing 26, for preventing the light from leaking. The supplementary reflecting plate 27 is formed of the same material as that of the reflecting plate 12a. According to the above-mentioned method, the digitizer 40 is mounted at the incident part of the LCD device according to the present invention.

Hereinafter, a structure for mounting the digitizer 40 at an opposite side of the incident part will be described with reference to FIG. 5.

Figure 5:
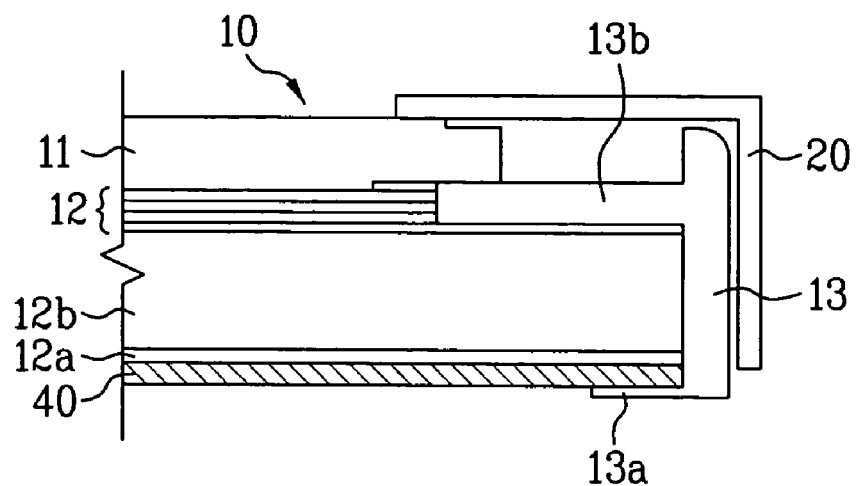
FIG. 5 is a cross-sectional view illustrating a digitizer mounted to an opposite side of an incident part of an LCD device according to the present invention.

FIG. 5 is a cross-sectional view illustrating an opposite-incident part of the LCD device according to the present invention. As shown in FIG. 5, a ledge (extension) 13a is provided in the support main 13 at an opposite side of the incident part, for fixing the digitizer 40. The ledge 13a is extended from a bottom of the main support 13, whereby the ledge 13a serves as a supporter for the digitizer 40. Also, the ledge 13a compensates a thickness extended from a bottom of the lamp housing 26 at the incident part. That is, the ledge 13a has the same thickness as that of the lamp housing 26.

More specifically, the stable structure of the digitizer 40 will be described as follows. In the incident part, the digitizer 40 is clamped by the opening of the lamp housing 26, and the lamp housing 26 is fixed to one side of the main support 13. In the opposite-incident part, each end portion of the digitizer 40, the reflecting plate 12a, the light-guiding plate 12b and some sheets are inserted between the ledge 13a of the main support 13 and a panel supporter 13b, and then fixed therebetween.

For the stable fixation, the ledge 13a is integrated with the support main 13. Preferably, the ledge 13a is provided along the bottom of the support main 13 at a longitudinal direction to obtain the stable fixation. Meanwhile, in order to obtain the desired thin profile and lightness of the LCD device with the aforementioned digitizer, a reflecting means is provided that is integrated with the digitizer according to the present invention instead of requiring a reflecting plate to be inserted into the lamp housing. As a result, the reflecting means serves as the reflecting plate on the digitizer.

Figure 6:
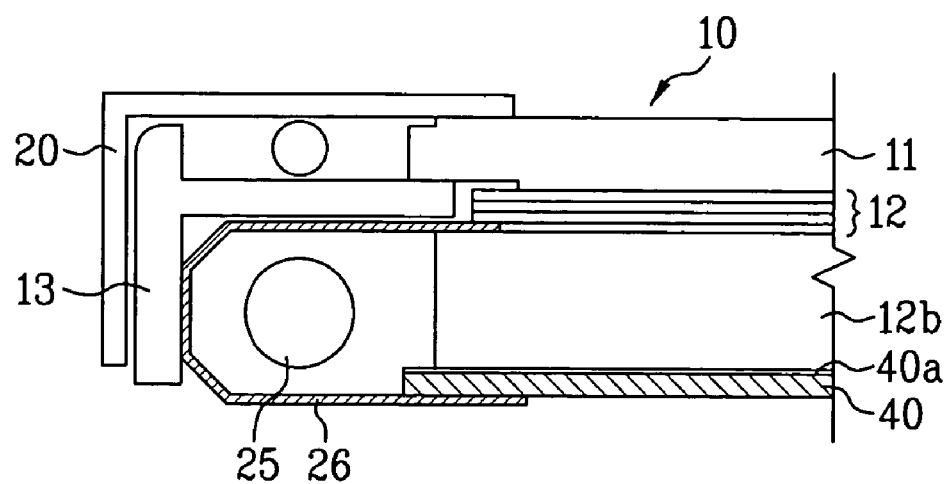
FIG. 6 is a cross-sectional view illustrating an LCM to which a digitizer having a reflecting means is mounted.

FIG. 6 is a cross-sectional view illustrating an LCD device with a digitizer 40 forming a reflecting means at a portion adjacent to a lamp housing 26 according to the present invention. At this time, the light is incident on a bottom of an LCD panel 11 in order to display a picture image, and a backlight emits the light. The backlight is comprised of a lamp 25, a lamp housing 26, a light-guiding plate 12b, and a plurality of sheets 12.

When assembling the backlight of an LCM 10, the digitizer 40 is assembled by inserting one end thereof into the lamp housing 26. Herein, the digitizer 40 uses a sensor for detecting a touching point of an electron (stylus) pen according to an EM mode. Thus, it is not necessary to position the digitizer 40 at the front of the LCD panel 11. That is, the digitizer 40 is provided inside the backlight of the LCM 10, and a reflective coating process is performed to an inner surface of the lamp housing 26. Also, the lamp housing 26 has an opening at a portion adjacent to the light-guiding plate 12b. Then, the light-guiding plate 12b is provided on the digitizer 40, and each one end of the digitizer 40 and the light-guiding plate 12b is inserted into the opening of the lamp housing 26.

In this state, it is required to form the reflecting means on a lower surface of the light-guiding plate 12b for preventing the light from leaking outside the device. That is, the light is reflected to an upper side by the reflecting means. In the related art, an additional reflecting plate is provided on the lower surface of the light-guiding plate 12b, whereby the reflecting plate reflects the light to the upper side. However, the reflecting plate is positioned at the lowest surface of the main support 13, so that an additional supporter is required to prevent the reflecting plate from being damaged due to foreign materials or contact, or to fix the reflecting plate. That is, the reflecting material is deposited on the reflecting plate, and a stiffener such as paper is provided to the bottom of the reflecting plate, whereby the reflecting plate becomes thick.

Generally, the digitizer 40 is formed of PCB at a predetermined thickness, so that an upper surface of the digitizer 40 is provided as the reflecting means 40a, thereby obtaining the thinner profile as compared to that which is assembled using a separate reflecting plate and the digitizer 40. Thus, in the present invention, the reflecting means 40a is provided on the upper surface of the digitizer 40 mounted to the backlight.

The structure of the digitizer 40 having the aforementioned structure will be described in more detail. In an embodiment of the present invention, the reflecting means 40a is provided on the upper surface of the digitizer 40 mounted to the backlight according to the present invention. Hereinafter, the detailed structure of the aforementioned digitizer will be described as follows.

In one embodiment of the present invention, illustrated in FIG. 6, the reflecting means 40a forming the upper surface of the digitizer 40 is formed of a reflecting plate. That is, the reflecting plate substitutes for the upper surface of PCB forming the outside of the digitizer according to the related art. Thus, in order to form the upper surface of the digitizer 40 as the reflecting plate when assembling the digitizer 40, an upper surface of a plastic supporter forming the outside of the PCB of the digitizer is formed of the reflecting plate. As compared to the related art for forming the separate reflecting plate, and mounting the reflecting plate on the digitizer 40, the present invention makes it possible to decrease a thickness corresponding to the supporter for the separate reflecting plate according to the related art. Also, the digitizer 40 is inserted to the lamp housing 26 in this embodiment of the present invention, so that the upper surface of the digitizer 40 serves as the reflecting plate.

In another embodiment of the present invention, the reflecting means 40a of the digitizer 40 is formed of a reflecting sheet on the upper surface of the digitizer 40. The reflecting sheet is formed on an upper case of the digitizer 40, so it is not necessary to form an additional supporter. Thus, it is possible to obtain the thinner profile as compared to that in case for separately forming the digitizer 40 and the reflecting plate, and assembling the same according to the related art.

In another embodiment of the present invention, a reflecting material having great reflectivity is deposited on the upper surface of the digitizer 40 for the reflecting means 40a of the digitizer 40. It is possible to deposit the reflecting material on the upper surface of the digitizer 40 with the same material as that according to the related art. Also, the deposition surface of the reflecting material is not limited to the upper surface of the digitizer 40. Preferably, the reflecting material is deposited in a portion, to which the light of the lamp 25 is directly irradiated, at one end of the digitizer 40 inserted to the lamp housing 26, for preventing the light from leaking. Accordingly, in the digitizer 40 having the reflecting means 40a according to the present invention, it is possible to decrease the thickness of the backlight, thereby obtaining the thin profile and the lightness of the LCD device.

Meanwhile, it is necessary to hold the digitizer 40 inserted to the lamp housing 26 at the correct position not to be moved by the external force. Accordingly, one end of the digitizer 40 having the light-guiding plate 12a and the reflecting means 40a is inserted to the opening of the lamp housing 26 for the stable fixation of the digitizer 40, whereby the digitizer 40 is clamped by the lamp housing 26. Referring to FIG. 6, the light-guiding plate 12b is provided directly on the digitizer 40 having the reflecting means 40a, and each one end of the light-guiding plate 12b and digitizer 40 having the reflecting means 40a is inserted to the lamp housing 26. As a result, the digitizer 40 and the light-guiding plate 12b are clamped with the lamp housing 26. At this time, it is preferable to form the lamp housing 26 of a metal material having flexibility and stiffness.

Figure 1:
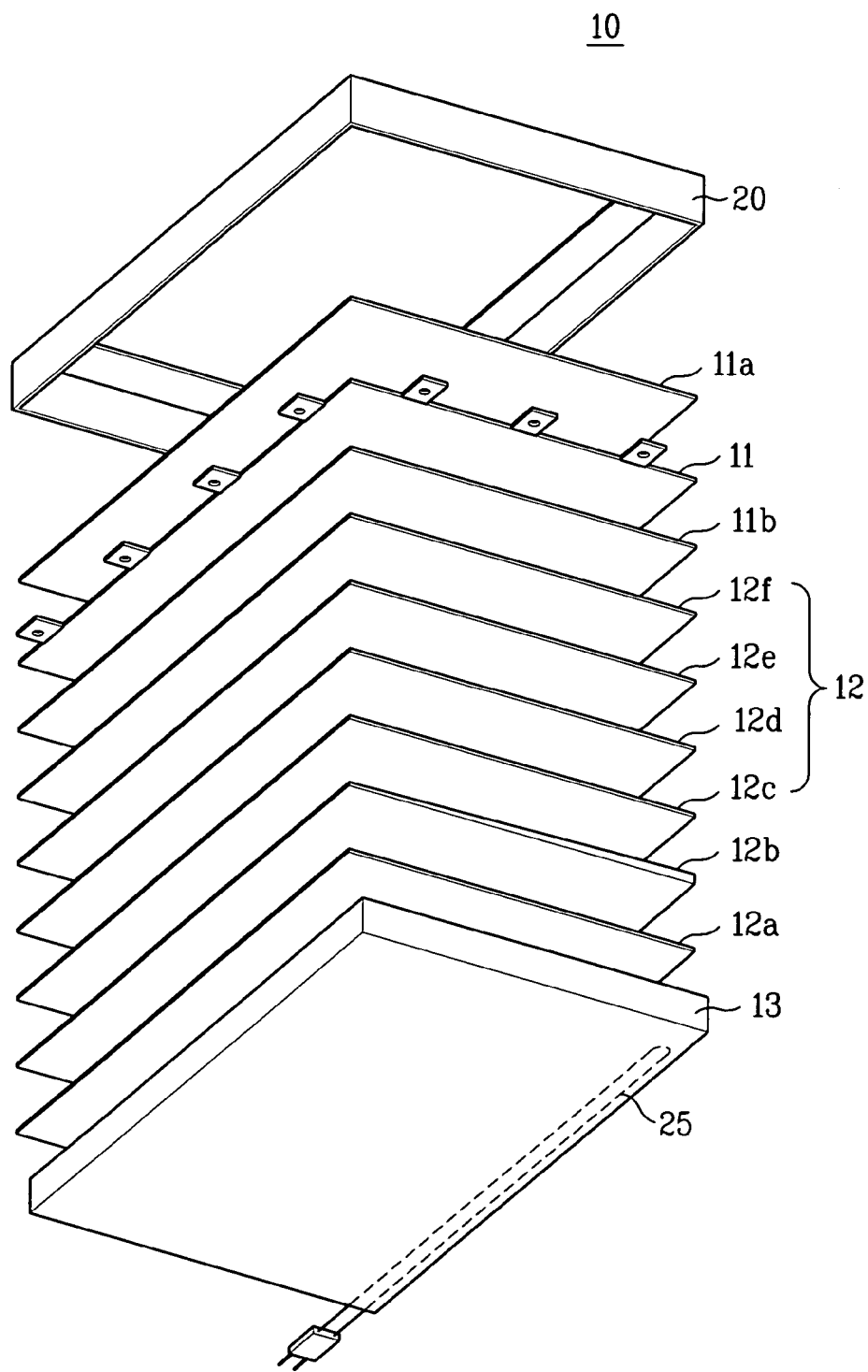
FIG. 1 is a perspective view illustrating a general LCM.
Figure 2:
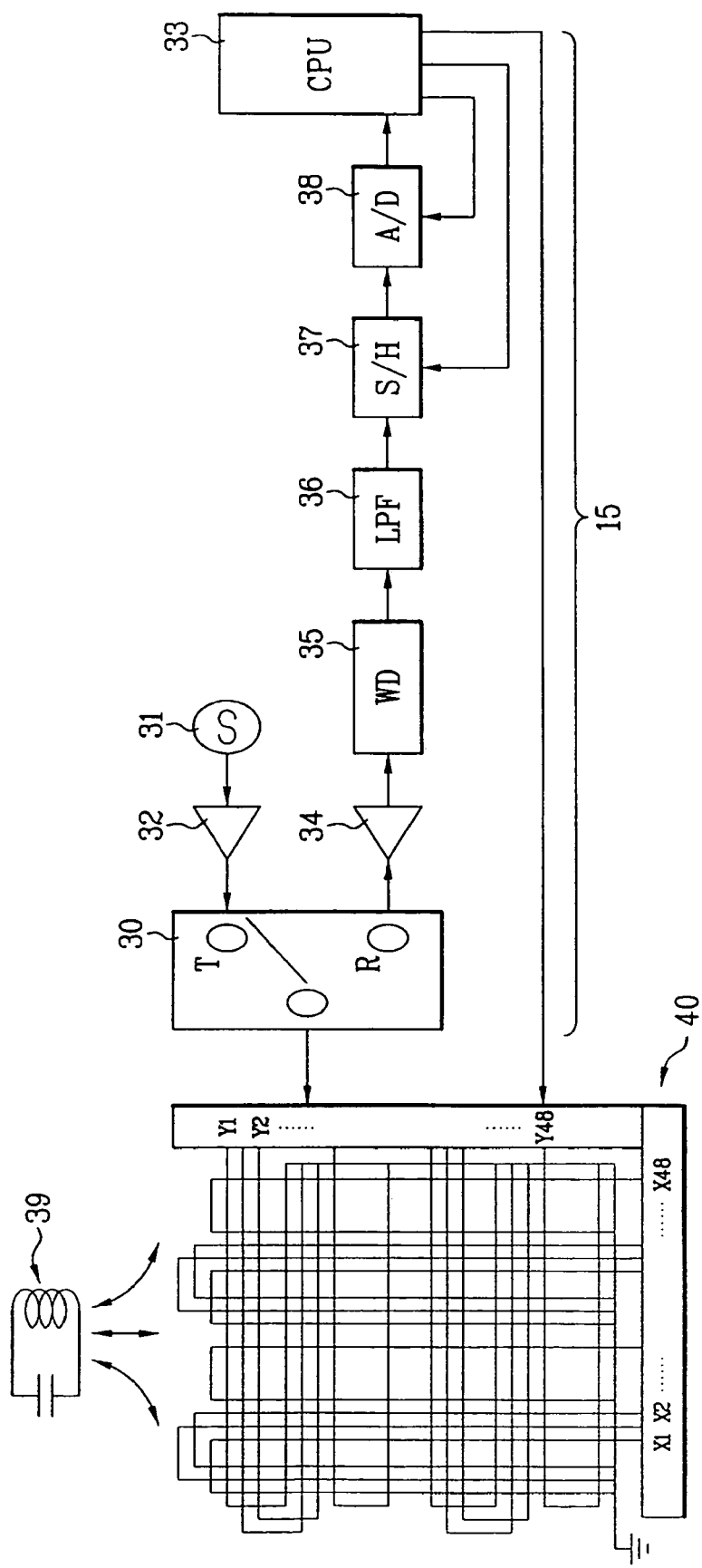
FIG. 2 is a block diagram illustrating a driving circuit and method of a general electromagnetic EM type digitizer.
Figure 3:
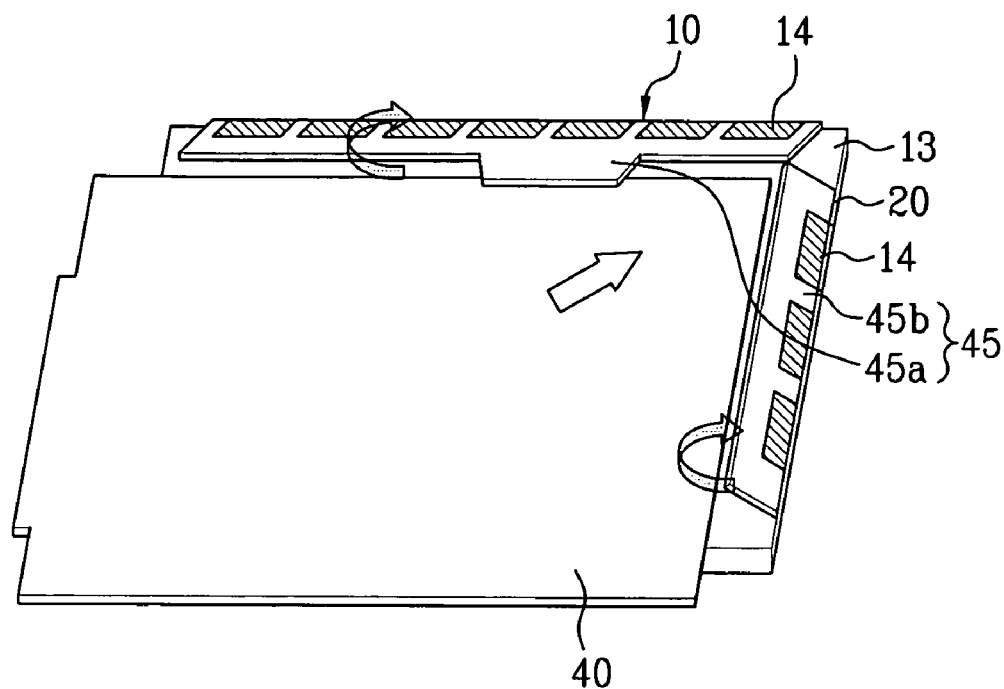
FIG. 3 schematically illustrates a digitizer mounted to an LCD device according to the related art.

Next, a method for manufacturing the LCD device with the digitizer 40 according to the present invention will be described with reference to FIG. 3.

First, the lamp housing 26 surrounding the lamp 25 is provided at one side of the support main 13. At this time, the lamp housing 26 has the opening at the portion adjacent to the light-guiding plate 12b. After that, each one end of the light-guiding plate 12b and the digitizer 40 is inserted to the opening of the lamp housing 26. Also, the plurality of sheets 12 are provided at the upper side of the lamp housing 26 for forming the light-path, thereby completing the assembly of the backlight. Then, the LCD panel 11 is provided above the lamp housing 26, and the PCB connected to the LCD panel 11 is provided at the rear of the support main 13. Subsequently, a top case 20 covers the upper surface of the LCD panel 11, thereby completing the LCM 10 having the digitizer 40 in the backlight thereof.

In the LCD device having the digitizer 40 according to the present invention, the digitizer 40 is previously assembled into the backlight, so that is it not required to lift up the PCB 45 for mounting the digitizer 40 therein. At this time, it is not required to form the separate reflecting plate. Referring to FIG. 6, the upper surface of the digitizer 40 is formed as the reflecting means 40a, thereby obtaining the thin profile and the lightness of the LCD device according to the present invention.

As mentioned above, the LCD device with the digitizer according to the present invention has the following advantages.

First, the digitizer is directly mounted and fixed to the backlight of the LCM, so that it is not required to obtain an extra space for an additional screw coupling to mount the digitizer at the rear of the LCM. As a result, it is possible to obtain the thin profile and the lightness of the LCD device according to the present invention.

Furthermore, the digitizer is previously assembled into the backlight when assembling the backlight. That is, it is not required to lift up the PCB and TCP to mounting the digitizer at the rear of the LCM, thereby preventing the PCB and TCP from being damaged.

Also, the upper surface of the digitizer is integrated with the reflecting means, thereby obtaining a thinner profile and lighter weight LCD device according to the present invention as compared to that of the LCD device according to the related art.

It will be apparent to those skilled in the art that various modifications and variation can be made in the present invention without departing from the spirit or scope of the invention. Thus, it is intended that the present invention cover the modifications and variation of this invention provided they come within the scope of the appended claims and their equivalents.

What is claimed is:

1. An LCD device with a digitizer comprising:
   a support main having therein an LCD panel, and a backlight for providing light to the LCD panel;
   a lamp provided at one side of the support main for emitting light;
   a lamp housing surrounding the lamp, and having an opening; and
   a digitizer having one end thereof inserted to the opening of the lamp housing, and detecting coordinates of a predetermined point.

2. The LCD device of claim 1, wherein the digitizer is a sensor for detecting the coordinates of the predetermined point in an Electromagnetic mode.

3. The LCD device of claim 1, wherein the backlight includes:
   a light-guiding plate provided to be adjacent to the lamp for uniformly irradiating the light emitted from the lamp to an upper side; and
   a reflecting plate provided at a lower surface of the light-guiding plate, for reflecting the light emitted from the lamp to the upper side.

4. The LCD device of claim 3, wherein the lamp housing is formed of a metal material having stiffness and elasticity.

5. The LCD device of claim 4, wherein each one end of the light-guiding plate, the reflecting plate and the digitizer is inserted to the opening of the lamp housing, and then clamped to be fixed by the lamp housing.

6. The LCD device of claim 1, wherein a supplementary reflecting plate is provided in a portion, to which the light of the lamp is directly irradiated, at one end of the digitizer inserted to the lamp housing, for preventing the light from leaking.

7. The LCD device of claim 1, wherein a ledge is formed in the support main at an opposite side of the lamp housing, for fixing the digitizer.

8. The LCD device of claim 7, wherein the ledge has the same thickness as that of the lamp housing.

9. The LCD device of claim 1, wherein an upper surface of the digitizer is formed of a reflecting means.

10. The LCD device of claim 9, wherein a light-guiding plate is formed on an upper surface of the reflecting means for irradiating the light emitted from the lamp to the upper side uniformly.

11. The LCD device of claim 9, wherein the reflecting means of the digitizer is a reflecting plate.

12. The LCD device of claim 9, wherein the reflecting means of the digitizer is a reflecting sheet on the tipper surface of the digitizer.

13. The LCD device of claim 9, wherein the reflecting means of the digitizer is formed of a reflecting material deposited on the upper surface of the digitizer.

14. A method for manufacturing an LCD device with a digitizer comprising:
   a first step for adhering a lamp housing surrounding a lamp as a light source to one side of a support main;
   a second step for inserting each one end of a digitizer and a light-guiding plate to an opening of the lamp housing; and
   a third step for depositing a plurality of sheets and an LCD panel to form light-path by guiding light to an upper side of the lamp housing.

15. The method of claim 14, wherein the digitizer and the light-guiding plate, inserted in the second step, are clamped by the lamp housing.

16. The method of claim 14, wherein a reflecting means is formed for being integrated with an upper surface of the digitizer in the second step.

* * * * *